(No Model.)

J. H. QUICK.
ADJUSTING SCREW.

No. 451,071. Patented Apr. 28, 1891.

UNITED STATES PATENT OFFICE.

JOHN H. QUICK, OF CINCINNATI, OHIO.

ADJUSTING-SCREW.

SPECIFICATION forming part of Letters Patent No. 451,071, dated April 28, 1891.

Application filed December 22, 1890. Serial No. 375,461. (No model.)

*To all whom it may concern:*

Be it known that I, JOHN H. QUICK, a citizen of the United States, residing at Cincinnati, in the county of Hamilton and State of Ohio, have invented certain new and useful Improvements in Adjusting-Screws; and I do hereby declare the following to be a full, clear, and exact description of the invention, reference being had to the annexed drawings, which form part of this specification.

This invention relates to those screws wherewith any shiftable part of an instrument or machine may be moved with reference to a fixed part and then securely held in the desired position; and my improvement consists in making such adjusting devices of two separate and distinct members. One of these members is a sleeve screw-threaded externally, but having a smooth or unthreaded axial bore, which sleeve engages with a threaded orifice of the shiftable part of the machine and has one end in contact with the fixed part thereof. The other member of the adjusting device takes the shape of an ordinary screw or bolt with a head or equivalent turning appliance at one end and a screw-thread at its other end, the intermediate portion or barrel of said screw being unthreaded, or at least incapable of engaging with the sleeve. The proper adjustment of the instrument or machine is effected by screwing the sleeve into the shiftable part until it bears against the fixed part and then passing the screw or bolt through said sleeve and engaging its threaded portion with a female thread of said fixed part, as hereinafter more fully described.

Figure 1:
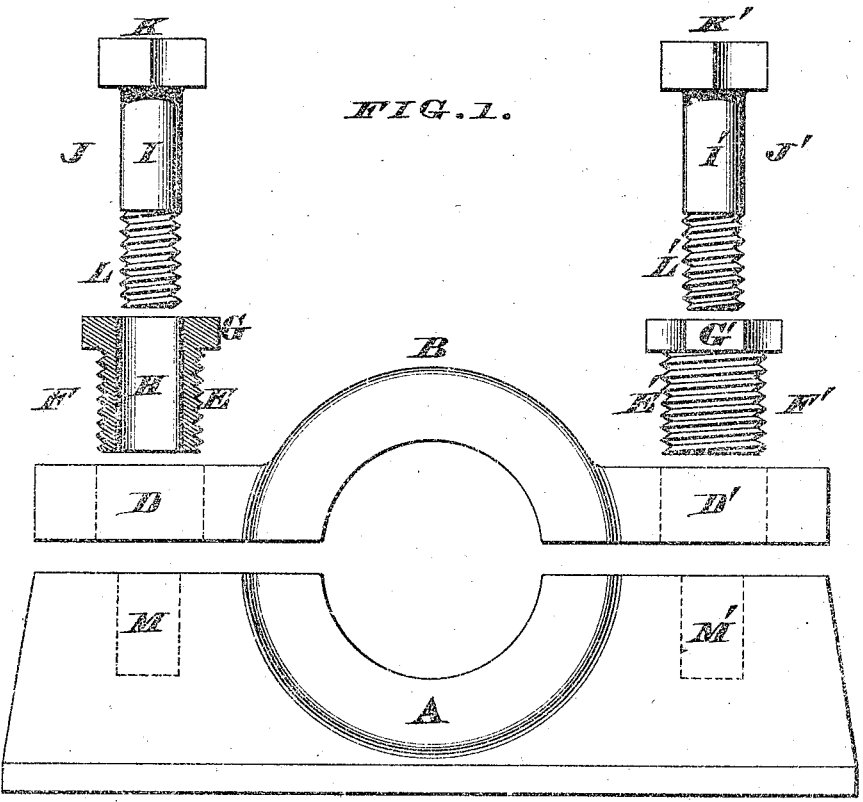
Figure 2:
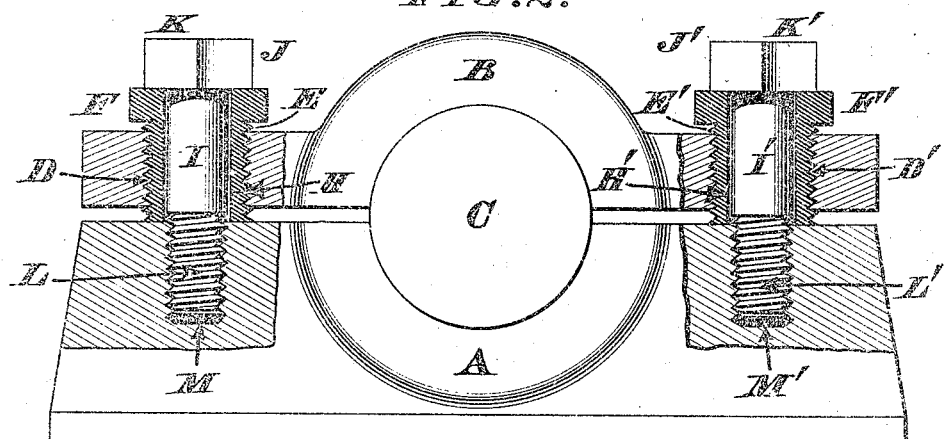

In the annexed drawings, Figure 1 shows a pair of my adjusting-screws arranged for use with an ordinary journal-bearing, the various parts of the screws and bearing being separated from each other and one of the sleeves being sectioned. Fig. 2 shows a shaft journaled in the bearing and secured by a cap, which latter is adjusted to said shaft and held in place by the adjusting-screws.

For the purpose of illustrating the principle of my invention I have selected an ordinary journal-bearing consisting of a box or pillow A and removable cap B, which parts are adapted to receive a shaft C. Cap B has a pair of screw-threaded holes D D', wherewith are engaged the screw-threads E E' of sleeves F F', which sleeves have suitable heads or other turning appliances G G' and smooth or unthreaded axial bores H H'.

I I' are the barrels of screws or bolts J J', which bolts have heads or other turning appliances K K' and threaded portions L L', which latter are adapted to engage with threaded apertures or sockets M M' of the base or pillow A. After the shaft C has been journaled in the bearing A B the sleeves F F' are engaged with the threaded apertures D D' and are screwed therein until the ends of said sleeves come in contact with the pillow A, and then said sleeves are turned cautiously until the desired adjustment of cap B has been effected. This turning of the sleeves is then stopped, and they are afterward traversed by the retaining-screws or bolts J J', the smooth barrels of which I I' occupy the smooth bores H H' of said sleeves. These retaining-bolts are screwed into the sockets M M' until their heads K K' bear very firmly against the outer ends of the sleeves, which act fastens the cap B securely to pillow A, and thus prevents accidental shifting or detachment of these two parts A and B.

From the above description it is apparent that the adjustment is effected wholly by the sleeves, while the retaining of the movable part is performed entirely by the bolts or screws, thus dividing the duty between the members F and J. Hence it is evident that this construction has a decided advantage over those arrangements where a single screw or bolt must perform the twofold duties of adjusting the movable or shiftable part and then holding it in place. Finally, my invention has been shown as adapted to a journal box or bearing, although it is not limited to any special duty, but may be used whenever it is desired to move one part with reference to another, either for levelling or focusing or applying tension or for any adjusting purpose whatever.

I claim as my invention—

A stationary member A, having a screw-threaded portion M, and a shiftable member B, having a screw-threaded opening D, in combination with the sleeve E F H and
5 headed fastener J K, whose thread L engages with said screw portion M, for the purpose herein described.

In testimony whereof I affix my signature in presence of two witnesses.

JOHN H. QUICK.

Witnesses:
JAMES H. LAYMAN,
SAMUEL M. QUINN.